United States Patent
Park

(10) Patent No.: US 11,882,419 B2
(45) Date of Patent: Jan. 23, 2024

(54) WIRELESS SPEAKER CHAIR

(71) Applicant: TROUND INC., Hanam-si (KR)

(72) Inventor: Jea Bum Park, Namyangju-si (KR)

(73) Assignee: TROUND INC., Hanam-si (KR)

( * ) Notice: Subject to any disclaimer, the term of this patent is extended or adjusted under 35 U.S.C. 154(b) by 0 days.

(21) Appl. No.: 18/153,176

(22) Filed: Jan. 11, 2023

(65) Prior Publication Data

US 2023/0179918 A1    Jun. 8, 2023

Related U.S. Application Data

(63) Continuation of application No. PCT/KR2021/010468, filed on Aug. 9, 2021.

(30) Foreign Application Priority Data

Aug. 28, 2020   (KR) .................. 10-2020-0108977

(51) Int. Cl.
  *H04R 5/02*   (2006.01)
  *A47C 7/72*   (2006.01)
  *H02J 50/00*  (2016.01)

(52) U.S. Cl.
  CPC ............ *H04R 5/023* (2013.01); *A47C 7/727* (2018.08); *H02J 50/00* (2016.02); *H04R 2400/11* (2013.01); *H04R 2420/07* (2013.01)

(58) Field of Classification Search
  CPC .............. H04R 5/023; H04R 2400/11; H04R 2420/07; A47C 7/727; H02J 50/00
  USPC ........................................................ 381/301
  See application file for complete search history.

(56) References Cited

U.S. PATENT DOCUMENTS

| | | | | |
|---|---|---|---|---|
| 2006/0269068 A1* | 11/2006 | Yokota | ............... | H04R 5/023 381/1 |
| 2018/0201373 A1 | 7/2018 | Tracy | | |
| 2019/0021504 A1* | 1/2019 | Cho | ................ | A47C 7/72 |

FOREIGN PATENT DOCUMENTS

| JP | 2006-345477 A | 12/2006 |
|---|---|---|
| JP | 2008-271600 A | 11/2008 |
| KR | 10-2004-0026541 A | 3/2004 |
| KR | 10-2017-0028173 A | 3/2017 |
| KR | 10-2018-0108923 A | 10/2018 |

OTHER PUBLICATIONS

International Search Report issued in PCT/KR2021/010468; dated Nov. 24, 2021.
"Request for the Submission of an Opinion" Office Action issued in KR 10-2020-0108977; mailed by the Korean Intellectual Property Office dated Apr. 27, 2022.
"Written Decision on Registration" Office Action issued in KR 10-2020-0108977; mailed by the Korean Intellectual Property Office dated Jul. 20, 2022.

* cited by examiner

*Primary Examiner* — Paul Kim
(74) *Attorney, Agent, or Firm* — Studebaker & Brackett PC

(57) ABSTRACT

The present invention relates to a wireless speaker chair, and more particularly, to a wireless speaker chair capable of providing a sense of space and a three-dimensional effect to a user who sits in the chair through sounds output from a plurality of speaker channels and allowing the plurality of speaker channels to wirelessly receive sound signals and power which are received to output sounds.

12 Claims, 11 Drawing Sheets

WIRELESS SPEAKER CHAIR

CROSS-REFERENCE TO RELATED APPLICATION

This application is based on the PCT Application No. PCT/KR2021/010468, filed on Aug. 9, 2021, and claims the benefit of priority from the prior Korean Patent Application No. 10-2020-0108977, filed on Aug. 28, 2020, the disclosure of which is incorporated herein by reference in its entirety.

BACKGROUND

1. Field of the Invention

The present invention relates to a wireless speaker chair, and more particularly, to a wireless speaker chair capable of providing a sense of space and a three-dimensional effect to a user who sits in the chair through sounds output from a plurality of speaker channels and allowing the plurality of speaker channels to wirelessly receive sound signals and power which are received to output sounds.

2. Discussion of Related Art

In general, a speaker used while being connected to a computer generates sound by converting a current flowing through a wire into an electrical signal and a vibration signal and generating vibrations using a vibration portion.

For example, when watching a movie or playing a game using a computer, a user not only watches images on a screen of the computer but also listens to sounds due to an electrical signal being transferred and vibrations generated by a speaker corresponding to the images being transferred to ears of the user while the user sits in a chair where a monitor of the computer is seen.

Particularly, a multi-channel sound system including a plurality of such speakers has an advantage of allowing a user to more exquisitely experience a direction, level, and the like of a sound in an image.

However, in order to implement such multi-channel sound systems, it is necessary to provide a plurality of speakers above and below a desk, behind a chair, and the like and to electrically connect all of the plurality of speakers such that there is a great restriction in space.

Also, although a multi-channel sound system is implemented by arranging the plurality of speakers, there is a problem that a position of the chair is changed or a variety of physical interferences are present between the speakers and the user who sits in the chair.

SUMMARY OF THE INVENTION

The present invention is directed to providing a chair including at least 1) a backrest portion configured to support a back and waist part of a user, 2) side support portions configured to support sides of the user, 3) a seat portion configured to support a buttocks part and a part of legs of the user, and 4) a bottom support portion configured to support a bottom of the seat portion, the chair being able to implement a multi-channel sound system by including a speaker mounting member which is installed on at least one selected from the backrest portion and the seat portion and in which at least one speaker installation area is defined.

The present invention is also directed to providing a chair including at least 1) a backrest portion configured to support a back and waist part of a user, 2) side support portions configured to support sides of the user, 3) a seat portion configured to support a buttocks part and a part of legs of the user, 4) a bottom support portion configured to support a bottom of the seat portion, and 5) a headrest portion configured to support a head part of the user, the chair being able to implement a multi-channel sound system by including a speaker mounting member which is installed on the headrest portion and in which at least one speaker installation area is defined.

The chair may further include a wireless power reception portion installed in a predetermined area of the chair and configured to receive wirelessly supplied power and a wireless signal reception portion configured to receive a wirelessly transmitted audio signal and transmit the received audio signal to a speaker installed in the speaker installation area. In this way, the chair may be able to implement a wireless sound system by allowing at least one speaker installed on the speaker mounting member to wirelessly receive sound signals and power which are received to output sounds.

According to one aspect of the present invention, there is provided a wireless speaker chair including at least 1) a backrest portion configured to support a back and waist part of a user, 2) side support portions configured to support sides of the user, 3) a seat portion configured to support a buttocks part and a part of legs of the user, and 4) a bottom support portion configured to support a bottom of the seat portion, the wireless speaker chair including a wireless power reception portion installed in a predetermined area of the chair and configured to receive wirelessly supplied power, a speaker mounting member in which at least one speaker installation area, in which at least one speaker configured to operate by receiving power from the wireless power reception portion is installed, is defined, and a wireless signal reception portion configured to receive a wirelessly transmitted audio signal and transmit the received audio signal to the speaker installed in the speaker installation area.

Here, the speaker mounting member may be installed on the seat portion, the backrest portion, and/or the headrest portion.

The term "multi-channel sound system" used in this application refers to a sound system implemented through at least two or more independent channels, and to this end, at least two speakers, or at least three or more speakers, may be included in the multi-channel sound system.

According to the present invention, there is an advantage that a user can experience vivid sounds like those existing in actually reproduced images or game environments just by sitting in a chair.

In particular, since it is possible to transfer generated sounds to the user while the sounds are separated in a variety of directions such as frontward, rearward, sideward, upward, and downward directions in reproduced images or game environments according to positions and the number of speakers provided in the chair, a true multi-channel sound system can be implemented.

Also, the chair according to the present invention has an advantage that a user experience can be significantly improved by allowing sound signals and power for implementing the multi-channel sound system to be received in a wireless environment.

Specific advantageous effects of the present invention, in addition to the advantageous effects described above, will be described below in the description of details for carrying out the invention.

DETAILED DESCRIPTION OF EXEMPLARY EMBODIMENTS

Figure 1:
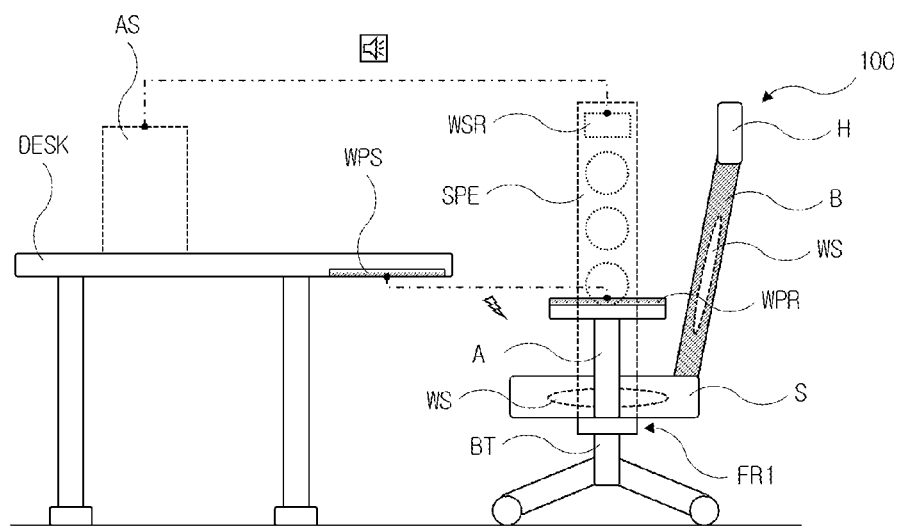
FIG. 1 is a lateral view of a chair according to one embodiment of the present invention.

Specific terms are defined in this application to assist in better understanding of the present invention. Unless otherwise defined in this application, scientific and technical terms used therein have the same meaning as commonly understood by one of ordinary skill in the art. Also, it should be understood that, unless particularly specified in the context, terms in singular forms include their plural forms, and terms in plural forms include their singular forms.

Hereinafter, a wireless speaker chair according to some embodiments of the present invention will be described in detail with reference to the accompanying drawings. Also, each piece of content relating to the chair according to some embodiments of the present invention described with reference to the accompanying drawings should be understood as an independent embodiment, and at least two independent embodiments may be combined when necessary. Meanwhile, components of a previously-described embodiment or an embodiment to be described may be referenced for components insufficiently described through the accompanying drawings.

According to one aspect of the present invention, there is provided a wireless speaker chair including at least 1) a backrest portion configured to support a back and waist part of a user, 2) side support portions configured to support sides of the user, 3) a seat portion configured to support a buttocks part and a part of legs of the user, and 4) a bottom support portion configured to support a bottom of the seat portion, the wireless speaker chair including a wireless power reception portion installed in a predetermined area of the chair and configured to receive wirelessly supplied power, a speaker mounting member in which at least one speaker installation area, in which at least one speaker configured to operate by receiving power from the wireless power reception portion is installed, is defined, and a wireless signal reception portion configured to receive a wirelessly transmitted audio signal and transmit the received audio signal to the speaker installed in the speaker installation area.

Here, the chair may selectively include a headrest portion configured to support a head part of the user, and here, the headrest portion may be integrally provided with the backrest portion or separately provided therefrom.

In a case in which the headrest portion is separately provided from the backrest portion, the headrest portion may be detachable from the backrest portion. Also, in a case in which the headrest portion is integrally provided with the backrest portion, the headrest portion and the backrest portion may be substantially provided as a single component and may be indistinguishable from each other.

Accordingly, even in a case in which the headrest portion is illustrated as being included in the chair illustrated in the accompanying drawings, the headrest portion should be understood as a component that may be omitted or detached or a component that may be integrally formed with the backrest portion.

Also, although the chair illustrated in the accompanying drawings is illustrated as a movable chair, in which a movable member (e.g., a wheel) is provided at a lower portion of the chair, the present invention is not necessarily limited thereto, and it should be understood that the chair may also be provided in the form of an immovable chair, such as a sofa or a stationary chair.

Figure 2:
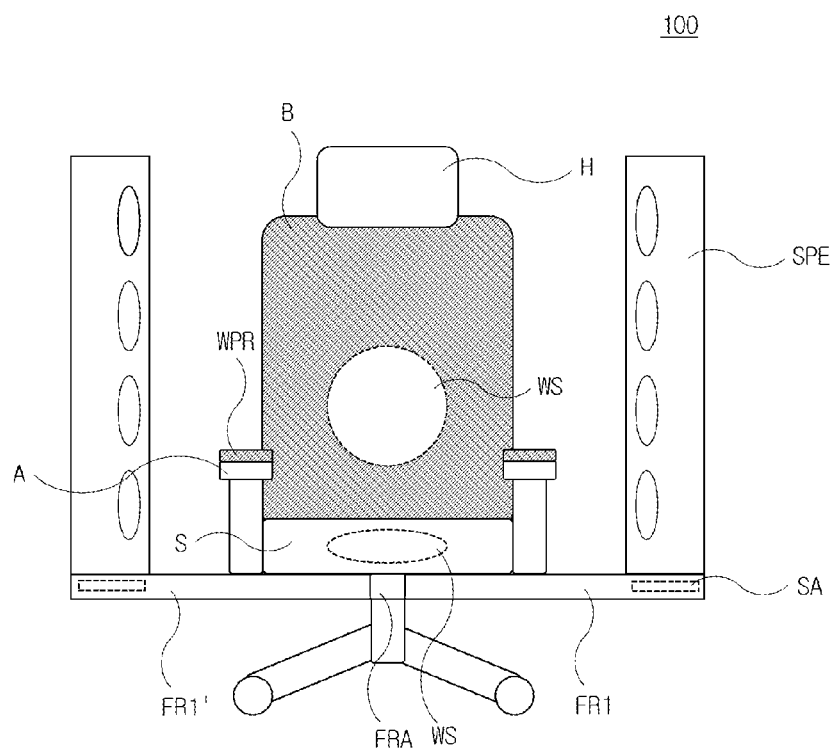
FIG. 2 is a front view of the chair illustrated in FIG. 1.

FIG. 1 is a lateral view of a chair according to one embodiment of the present invention, and FIG. 2 is a front view of the chair illustrated in FIG. 1.

Referring to FIGS. 1 and 2, a chair 100 may include a backrest portion B configured to support a back and waist part of a user who sits in the chair 100, a seat portion S configured to support a buttocks part and a part of legs of the user, and a headrest portion H configured to support a head part of the user. As described above, the headrest portion H may be installed above the backrest portion B, and here, the headrest portion H may be configured to be detachable from the backrest portion B or integrally formed with the backrest portion B as necessary.

For comfort of the user who sits in the chair 100, the headrest portion H, the backrest portion B, and the seat portion S may be provided in the form in which a front or inside (that is, a part which comes into contact with the back, waist, and side parts of the user) is formed of a cushioning material or has a cushioning material added thereon.

Also, a woofer speaker WS may be additionally provided on the front or inside of the backrest portion B and/or the seat portion S. Since vibrations generated by the woofer speaker WS may be directly transferred to the user who sits in the chair 100, there is an advantage that a more vivid user experience can be provided. The woofer speaker WS provided on the inside of the backrest portion B and/or the seat portion S may be installed as many as an appropriate number necessary to implement a multi-channel sound system.

In addition, for comfort of the user who sits in the chair 100, at least one selected from a warmer, a ventilator, and a massager may be provided on the backrest portion B and/or the seat portion S.

A bottom support portion BT may be provided below the seat portion S, and the bottom support portion BT may further include a movable member such as a wheel. Also, the seat portion S and the bottom support portion BT may be integrally formed and provided as components indistinguishable from each other.

Meanwhile, although not separately illustrated in the drawings, a vibration dampening member OS may be selectively provided between the seat portion S and the bottom support portion BT. The vibration dampening member OS serves to prevent or reduce transmission of vibrations, generated from a plurality of speakers disposed relatively above the seat portion S, to a portion below the chair 100.

A speaker mounting member in which at least one speaker installation area SA is defined to implement a multi-channel sound system in the chair 100 may be installed in a predetermined area of the chair 100. At least one speaker configured to operate by receiving power from the wireless power reception portion may be installed in the at least one speaker installation area SA defined in the speaker mounting member.

Referring to FIGS. 1 and 2, the speaker mounting member may include a first frame FR1 provided to extend in a predetermined direction at the seat portion S, and the speaker installation area SA in which at least one speaker is installed may be defined in one end portion of the first frame FR1.

That is, the first frame FR1 extending in a direction crossing both sides of the chair 100 may be installed below the seat portion S, the speaker installation area SA may be defined in each of both end portions of the first frame FR1, and speakers SPE may be installed in the speaker installation areas SA. "Below the seat portion S" may refer to a bottom surface of the seat portion S, and the first frame FR1 may be installed on the bottom surface of the seat portion S.

Referring to FIG. 2, for convenience, the first frame FR1 is illustrated as having a linear shape, but the first frame FR1 may have a nonlinear shape including various shapes such as a broken-line shape or a curved shape, as necessary.

Here, the first frame FR1 may be selectively installed at the seat portion S with a frame rotating shaft FRA as a medium, and in this case, the first frame FR1 may be provided to be connected to the frame rotating shaft FRA to be rotatable within a predetermined angle range on a horizontal plane parallel to the ground.

Although not separately illustrated in the drawings, in order to prevent the chair 100 from losing balance and falling due to the weight of the speakers SPE installed in the first frames FR1, a weight compensating member may be installed in the chair 100. The weight compensating member may be installed on an additionally extending frame portion which is formed by additionally extending the frame in a direction opposite to the speaker about the frame rotating shaft which will be described below. Meanwhile, to allow the center of mass of the chair 100 to be maintained even when the weight of the speakers SPE is added, the weight compensating member may be installed on the seat portion S or the bottom support portion BT configured to support a bottom of the seat portion S, or a load of the seat portion S or the bottom support portion BT configured to support the bottom of the seat portion S may be increased.

Also, the first frame FR1 may be made of a lightweight rigid material such as carbon fibers.

In addition, as illustrated in FIG. 2, the first frame may be divided into two first frames FR1 and FR1' about the frame rotating shaft FRA, and in this case, one first frame FR1 may be provided to be rotatable within a predetermined angle range at a left side of the chair, and the other first frame FR1' may be provided to be rotatable within a predetermined angle range at a right side of the chair.

The number of first frames FR1 and FR1' and the positions and number of frame rotating shafts FRA to which the first frames FR1 and FR1' are connected may be appropriately changed as necessary.

The speakers SPE may be speakers in the form of a complete product, speaker units connected to driving portions separately provided at the speaker installation areas SA and configured to operate as a complete product, display type speakers, thin-film type speakers, or one-way and multi-way speakers, and the speakers SPE may operate by receiving sound signals wirelessly or may operate by receiving sound signals through wires when necessary.

For the speakers SPE to receive sound signals wirelessly, a wireless signal reception portion WSR configured to receive an audio signal transmitted from an audio source AS and transmit the received audio signal to the speakers SPE installed in the speaker installation area SA may be installed in a predetermined area of the chair 100.

The wireless signal reception portion WSR may be provided in the speaker installation area SA or may be provided in the speakers SPE installed in the speaker installation area SA. FIG. 1 illustrates a case in which the wireless signal reception portion WSR is embedded in the speakers SPE.

Also, the position at which the wireless signal reception portion WSR is installed is not necessarily limited thereto, and the wireless signal reception portion WSR may be installed in an arbitrary area of the chair 100, such as an arbitrary position selected from the headrest portion H, the backrest portion B, and the seat portion S, instead of being provided in the speaker installation area SA or the speaker SPE. In this case, sound signals received by the wireless signal reception portion WSR may be transmitted to the speaker SPE wirelessly and/or through wires.

The wireless signal reception portion WSR may wirelessly transmit or receive sound signals to or from the audio source AS such as a home theater, a TV, a set-top box, a sound bar, a computer, a cellular phone, or a tablet PC using a method such as Wi-Fi, Bluetooth, digital enhanced cordless telecommunications (DECT), or Li-Fi.

Meanwhile, the speakers SPE may be directly installed in the speaker installation areas SA, but the present invention is not necessarily limited thereto, and a separate speaker installation stand may be interposed between the speaker installation areas SA and the speakers SPE. Also, an angle of orientation of the speaker SPE toward the user who sits in the chair 100, a height of the speaker SPE, and the like may be adjusted using the speaker installation stand.

Power for driving the speakers SPE installed at the chair 100 may be wirelessly supplied, and to this end, a wireless power reception portion WPR configured to receive wirelessly supplied power may be provided in a predetermined area of the chair 100.

The wireless power reception portion WPR may be provided in the speaker installation area SA or the speaker SPE installed in the speaker installation area SA and directly transmit the wirelessly received power to the speaker SPE, or may be selectively or additionally provided on at least one position selected from the headrest portion H, the backrest portion B, the seat portion S, side support portions A, and the bottom support portion BT and indirectly transmit the wirelessly received power to the speaker SPE.

Referring to FIGS. 1 and 2, the chair 100 may further include the side support portions A configured to support sides of the user, and the wireless power reception portion WPR may be provided on the side support portions A. The position at which the wireless power reception portion WPR is installed is not very important in wirelessly receiving power for driving the speaker SPE, but, for example, the wireless power reception portion WPR may be positioned above the side support portions A. The side support portions A are so-called armrests configured to support arms of the user who sits in the chair 100. As illustrated in FIGS. 1 and 2, the side support portions A may be provided as separate components installed at both sides of the seat portion S. However, unlike this, the side support portions A may be integrally provided with the seat portion S and/or the backrest portion B.

Figure 3:
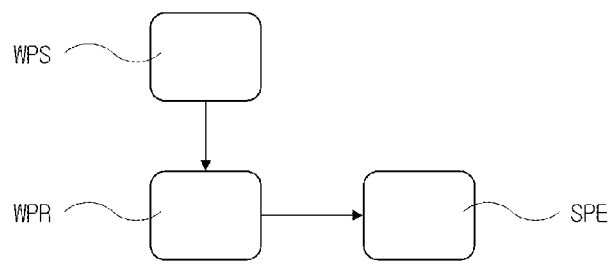
FIG. 3 illustrates a movement path of power implemented in the chair illustrated in FIG. 1.

FIG. 3 illustrates a movement path of power implemented in the chair illustrated in FIG. 1.

Referring to FIG. 3, power supplied from a wireless power supply portion WPS may be wirelessly supplied to the wireless power reception portion WPR provided in a predetermined area of the chair 100, and the power received by the wireless power reception portion WPR may be transmitted to the speaker SPE wirelessly and/or through wires.

As in the above-described power movement path, the wireless power reception portion WPR may, by being provided above the side support portion A, receive power wirelessly supplied by the wireless power supply portion WPS. For example, as illustrated in FIG. 1, the wireless power supply portion WPS may be provided at an arbitrary position in a desk and may, when a user maintains an appropriate distance from the desk while seated in the chair 100, be placed at a position adjacent to the wireless power reception portion WPR provided above the side support portion A. Accordingly, as the wireless power supply portion WPS and the wireless power reception portion WPR are adjacent to or come in contact with each other, the wireless power reception portion WPR may wirelessly receive power from the wireless power supply portion WPS. For convenience, only an example in which the wireless power supply portion WPS is provided in the desk is illustrated in the accompanying drawings, but the wireless power supply portion WPS may be provided in various other structures that may be placed at a position close to the chair 100 in which the wireless power reception portion WPR is provided.

The wireless power reception portion WPR may wirelessly receive power from the wireless power supply portion WPS using a contact or non-contact method. For example, at least one method selected from a magnetic field method, an electromagnetic wave method using radio frequency, and an ultrasonic wave method may be used. In a case in which the wireless power reception portion WPR wirelessly receives power from the wireless power supply portion WPS using a contact method, the wireless power reception portion WPR is required to be in contact with the wireless power supply portion WPS in order to wirelessly receive power therefrom. On the other hand, in a case in which the wireless power reception portion WPR wirelessly receives power from the wireless power supply portion WPS using a non-contact method, the wireless power reception portion WPR may wirelessly receive power from the wireless power supply portion WPS without being in contact therewith.

FIGS. 4 to 7 illustrate modified examples of a wireless power reception portion applied to the chair illustrated in FIG. 1 and illustrate various methods in which the wireless power reception portion applied to the chair illustrated in FIG. 1 electrically communicates with a wireless power supply portion.

Figure 4:
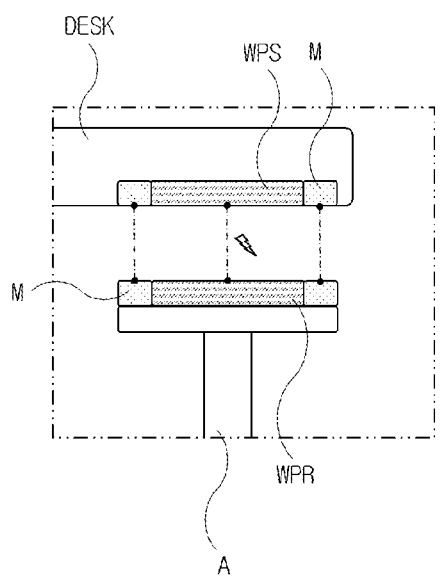
FIGS. 4 to 7 illustrate modified examples of a wireless power reception portion applied to the chair illustrated in FIG. 1.

First, referring to FIG. 4, a magnetic member M for magnetic coupling between the wireless power reception portion WPR and the wireless power supply portion WPS wirelessly supplying power to the wireless power reception portion WPR may be disposed at a position adjacent to the wireless power reception portion WPR. Also, in the desk, the same magnetic member M may be disposed at a position corresponding to the magnetic member M disposed at the position adjacent to the wireless power reception portion WPR in order to allow power to be transmitted and received in a state in which the wireless power supply portion WPS and the wireless power reception portion WPR are aligned with each other. Accordingly, by magnetic coupling between the magnetic member M disposed at the position adjacent to the wireless power reception portion WPR and the magnetic member M disposed at a position adjacent to the wireless power supply portion WPS, power may be transmitted and received in the state in which the wireless power supply portion WPS and the wireless power reception portion WPR are aligned with each other. Meanwhile, the magnetic member M may be a magnet that generates a magnetic force by itself (a permanent magnet, an electromagnet, or the like) or may be a metal member that may be coupled by forming a magnetic force with the magnet. For example, both the magnetic member M disposed at the position adjacent to the wireless power reception portion WPR and the magnetic member M disposed at the position adjacent to the wireless power supply portion WPS may each be the magnet. However, in another case, in a case in which the magnetic member M disposed at the position adjacent to the wireless power reception portion WPR is the magnet, the magnetic member M disposed at the position adjacent to the wireless power supply portion WPS may be the metal member that may be coupled by forming a magnetic force with the magnet. In still another case, in a case in which the magnetic member M disposed at the position adjacent to the wireless power supply portion WPS is the magnet, the magnetic member M disposed at the position adjacent to the wireless power reception portion WPR may be the metal member that may be coupled by forming a magnetic force with the magnet.

Figure 5:
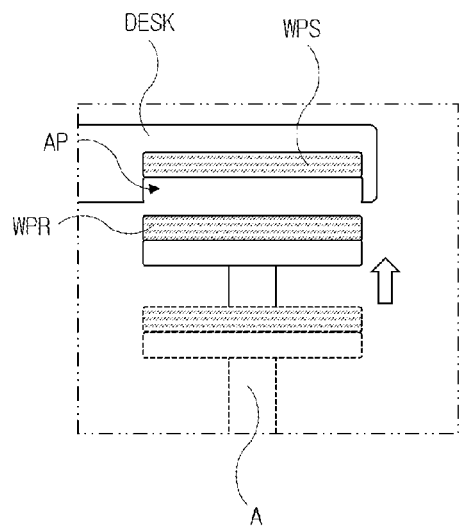

Meanwhile, referring to FIG. 5, even when a separate magnetic member M is not provided unlike in FIG. 4, power may be transmitted and received in the state in which the wireless power supply portion WPS and the wireless power reception portion WPR are aligned with each other.

To this end, a groove portion AP recessed at a predetermined depth may be provided in the desk, and the wireless power supply portion WPS may be positioned in the groove portion AP. Here, a thickness of the wireless power supply portion WPS may be smaller than the depth of the groove portion AP.

The side support portion A above which the wireless power reception portion WPR is provided may be provided to be able to move upward or downward in a vertical direction, and in a case in which the side support portion A is caused to move upward at a position at which the wireless power supply portion WPS and the wireless power reception portion WPR are aligned with each other, the wireless power reception portion WPR, which is provided above the side support portion A, and the wireless power supply portion WPS may be positioned at a distance that allows power to be transmitted and received wirelessly.

Here, by causing the side support portion A to move upward so that the wireless power reception portion WPR is positioned in the groove portion AP, the wireless power supply portion WPS and the wireless power reception portion WPR may not be easily detached while aligned with each other.

Also, the side support portion A may move the wireless power reception portion WPR upward to a position at which the wireless power reception portion WPR comes into contact with the wireless power supply portion WPS or may move the wireless power reception portion WPR upward to a height at which the wireless power reception portion WPR may wirelessly receive power from the wireless power supply portion WPS without coming into contact therewith.

Although not separately illustrated in the drawings, the wireless power supply portion WPS may be separated from its installation position and move downward independently, and in this case, the wireless power supply portion WPS may move downward to the height at which the wireless power reception portion WPR may wirelessly receive power.

Figure 6:
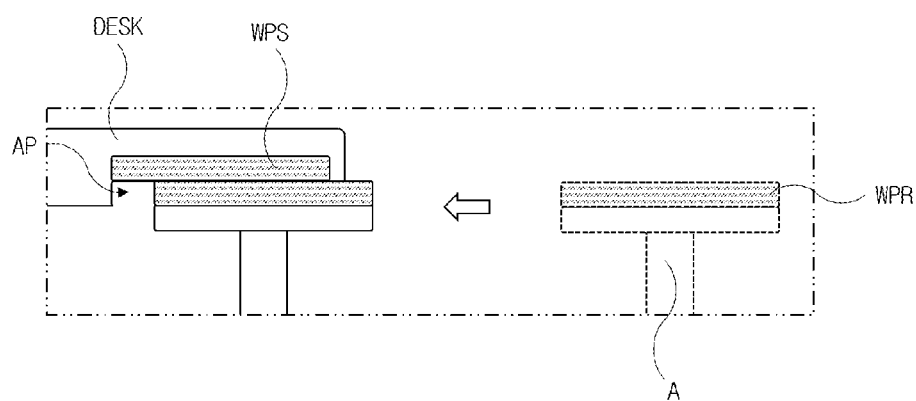

Referring to FIG. 6, the side support portion A may be provided to be able to slide back and forth to allow the wireless power reception portion WPR, which is provided above the side support portion A, and the wireless power supply portion WPS to be positioned at a distance at which power may be transmitted and received wirelessly.

Figure 7:
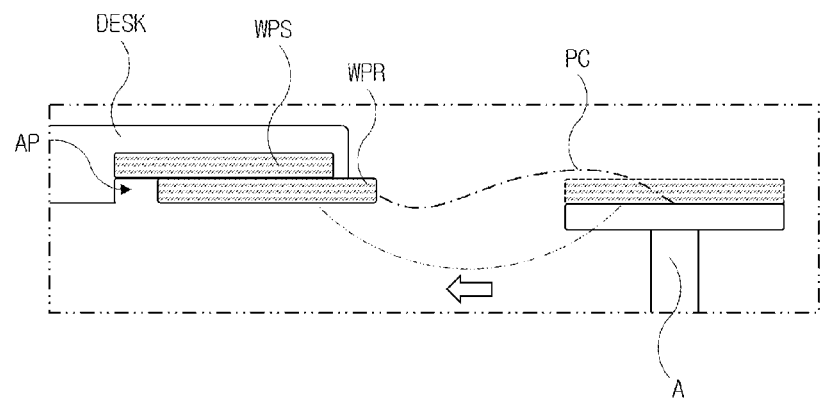
Figure 8:
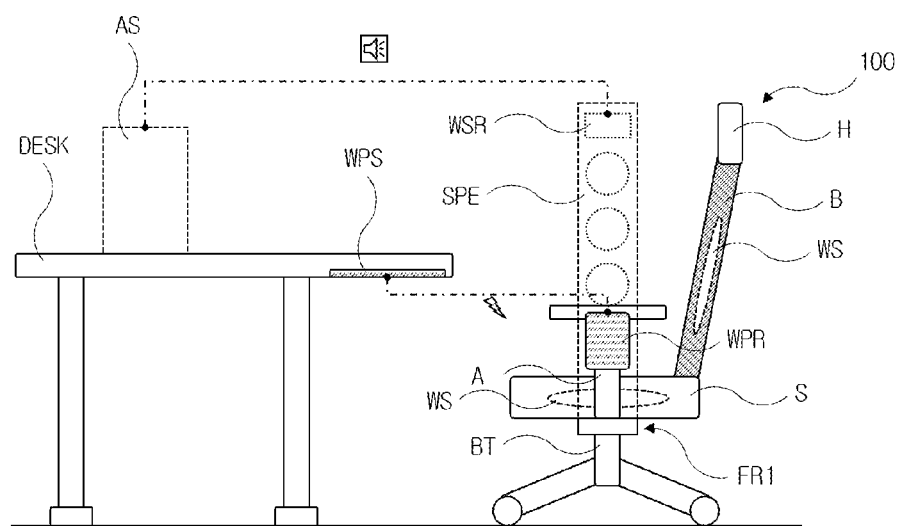
FIGS. 8 to 13 illustrate modified examples of the chair illustrated in FIG. 1.
Figure 9:
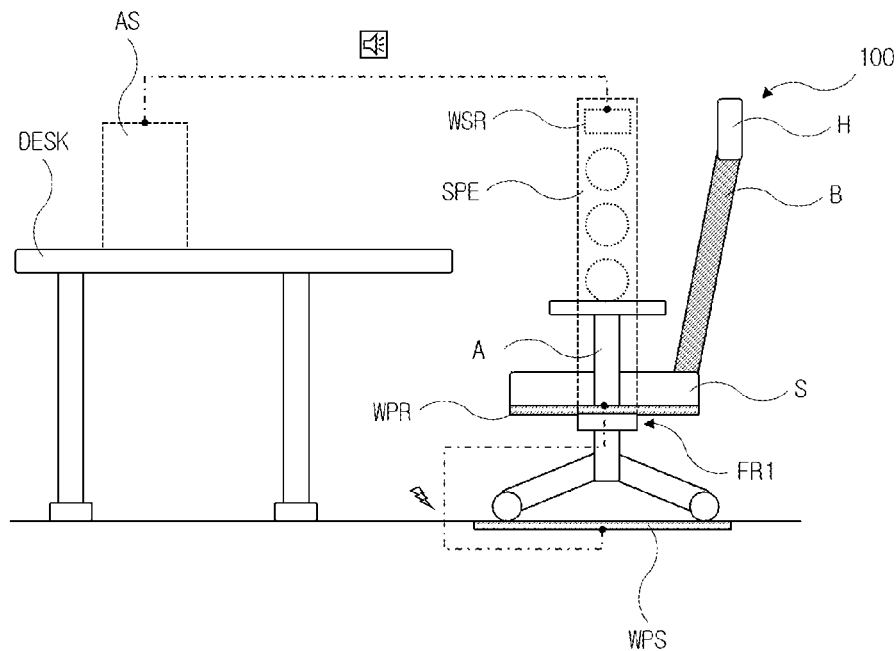
Figure 10:
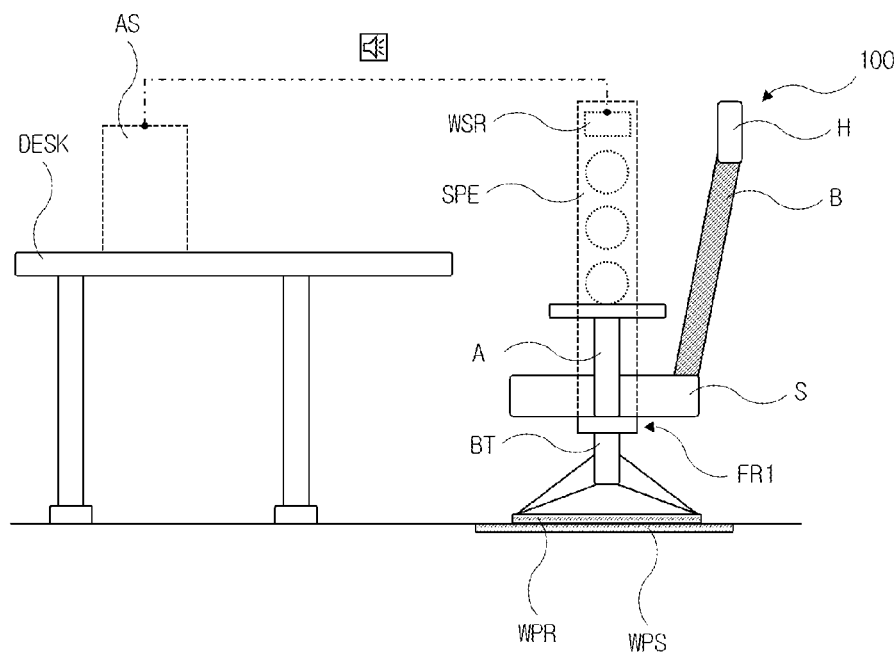

Meanwhile, referring to FIG. 7, instead of the side support portion A itself sliding back and forth, the wireless power reception portion WPR may be separated from the side support portion A and come into contact with the wireless power supply portion WPS so that power may be transmitted and received wirelessly. Here, the wireless power reception portion WPR may be separated from the side support portion A with a power cable PC as a medium, and to allow the wireless power reception portion WPR separated from the side support portion A to be fixed in a position at which the wireless power reception portion WPR may receive power from the wireless power supply portion WPS, the magnetic members M may be additionally provided to the wireless power reception portion WPR and the wireless power supply portion WPS as illustrated in FIG. 4.

As described above, the wireless power reception portion WPR may be provided in the speaker installation area SA or the speaker SPE installed in the speaker installation area SA and directly transmit the wirelessly received power to the speaker SPE, or may be selectively or additionally provided on at least one position selected from the headrest portion H, the backrest portion B, the seat portion S, the side support portions A, and the bottom support portion BT and indirectly transmit the wirelessly received power to the speaker SPE.

FIGS. 8 to 11 illustrate modified examples of the chair illustrated in FIG. 1. Referring to FIGS. 8 to 11, the wireless power reception portion WPR may be installed at the side support portion A and wirelessly receive power from the wireless power supply portion WPS provided in a structure spaced apart from the chair 100 (e.g., the desk) (see FIG. 8), may be installed at the seat portion S and wirelessly receive power from the wireless power supply portion WPS provided in a structure spaced apart from the chair 100 (e.g., a floor) (see FIG. 9), or may be installed at the bottom support portion BT and wirelessly receive power from the wireless power supply portion WPS provided in a structure spaced apart from the chair 100 (e.g., the floor) (see FIG. 10). Here, referring to FIG. 11, the wireless power reception portion WPR installed at the bottom support portion BT may be separated and move to a position at which the wireless power reception portion WPR may receive power from the wireless power supply portion WPS provided in a structure spaced apart from the chair 100.

Figure 11:
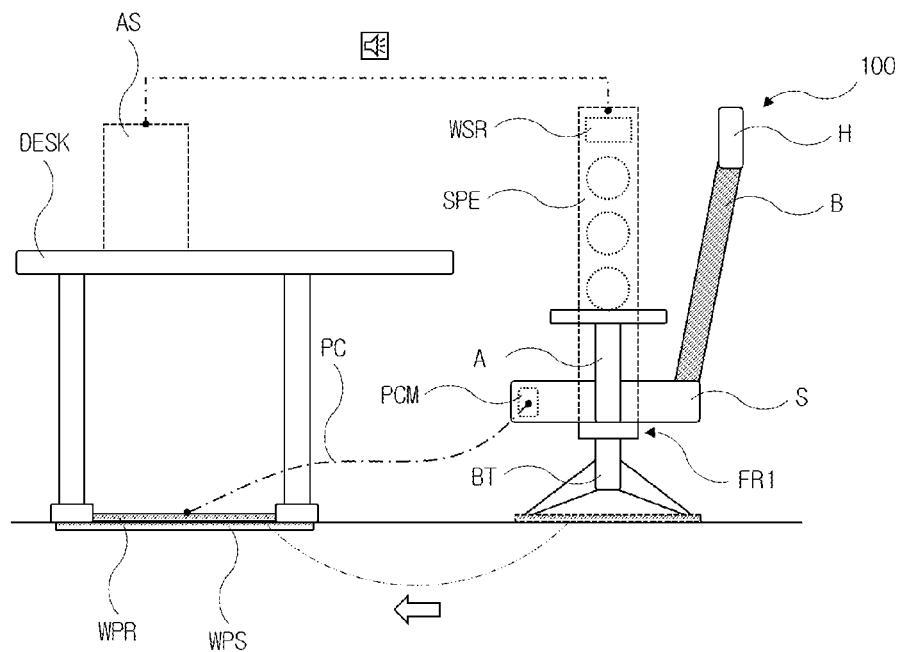

According to the method illustrated in FIG. 11, since power transmission and reception is made possible just by an operation of moving the wireless power reception portion WPR to a position at which the wireless power reception portion WPR may receive power from the wireless power supply portion WPS, there is an advantage that power can be transmitted and received more easily as compared to when a cord is plugged into an outlet to allow power transmission and reception.

Figure 12:
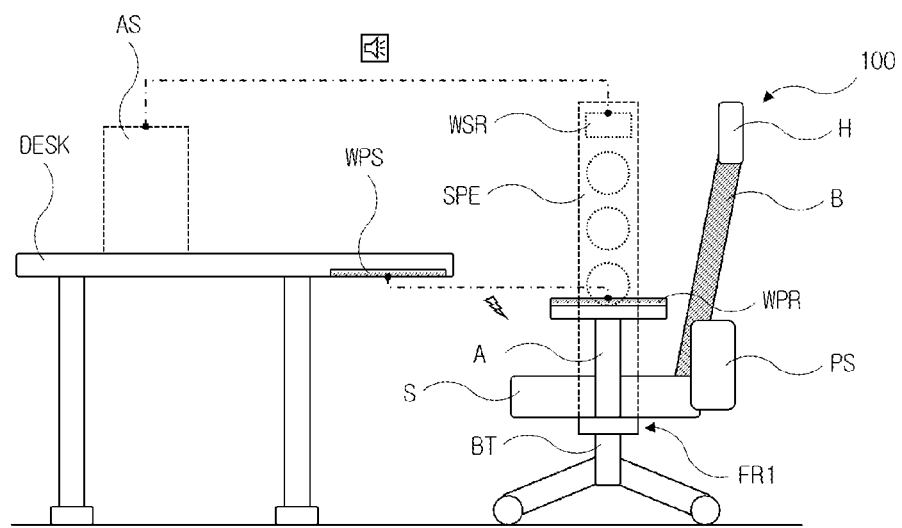
Figure 14:
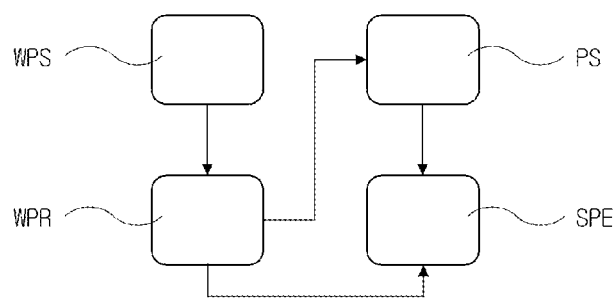
FIG. 14 illustrates a method in which a wireless power reception portion applied to the chair illustrated in FIG. 12 electrically communicates with a wireless power supply portion.

FIG. 12 illustrates another modified example of the chair illustrated in FIG. 1, and FIG. 14 illustrates a method in which a wireless power reception portion applied to the chair illustrated in FIG. 12 electrically communicates with a wireless power supply portion.

Referring to FIGS. 12 and 14, the chair 100 may further include a power storage portion PS electrically connected to the wireless power reception portion WPR to receive and store power (e.g., surplus power) received by the wireless power reception portion WPR.

As necessary, the power storage portion PS may be provided in the speaker installation area SA or the speaker SPE installed in the speaker installation area SA and directly transmit the stored power to the speaker SPE, or may be selectively or additionally provided on at least one position selected from the headrest portion H, the backrest portion B, the seat portion S, the side support portions A, and the bottom support portion BT and indirectly transmit the stored power to the speaker SPE.

Figure 13:
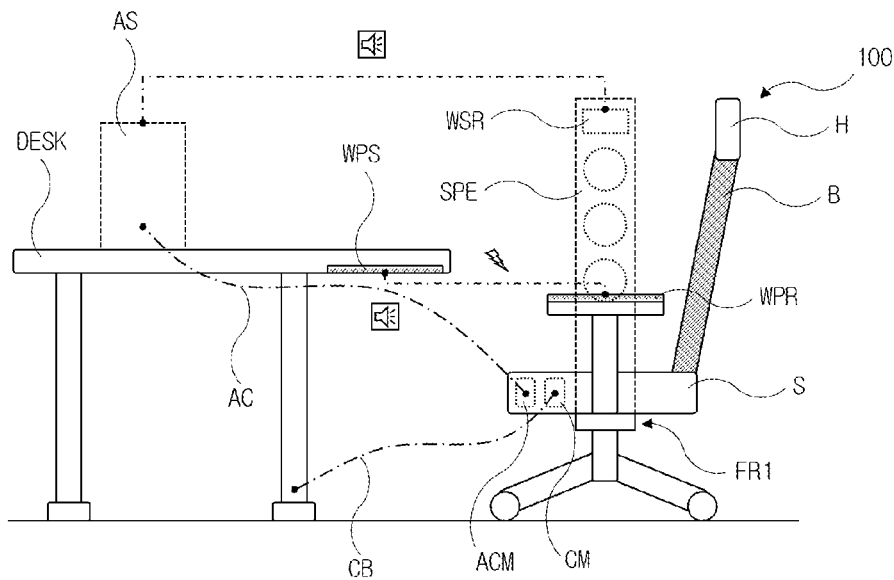

FIG. 13 illustrates still another modified example of the chair illustrated in FIG. 1. Referring to FIG. 13, the chair 100 may further include a binding portion CM configured to bind the chair 100 to an arbitrary structure. For example, the binding portion CM may bind the chair 100 to a structure such as furniture, a desk, or the like with a binding cable CB as a medium to limit the movement radius of the chair 100.

Also, in order to deal with a case in which the wireless signal reception portion WSR is not able to normally receive sound signals from the audio source AS such as a home theater, a TV, a set-top box, a sound bar, a computer, a cellular phone, or a tablet PC, the chair 100 may further include a reception portion ACM to receive the sound signals from the audio source AS through wires. A reception cable AC extending from the reception portion ACM may receive the sound signals by being directly connected to the audio source AS or being connected to an audio relay source configured to receive sound signals wirelessly from the audio source AS.

In a case in which the chair 100 moves excessively in a state in which the reception cable AC is connected to the audio source AS or the audio relay source, there is a concern of damage to the reception cable AC, the reception portion ACM or the audio source AS to which the reception cable AC is connected, and the like, and such a problem can be prevented by binding the chair 100 to an arbitrary structure and limiting the movement radius of the chair 100 using the binding cable CB.

Meanwhile, the binding portion CM and the reception portion ACM may be integrally provided unlike those illustrated in FIG. 13. In this case, the binding cable CB and the reception cable AC may be integrally provided or provided to have different lengths.

Also, although not separately illustrated in the drawings, a channel processing device, such as a receiver, in charge of reception, amplification, transmission, and the like of a multi-channel sound signal may be provided in an arbitrary area of the chair 100, and the audio source may be connected to the channel processing device to output a multi-channel sound signal corresponding to channels provided in the chair 100.

Figure 15:
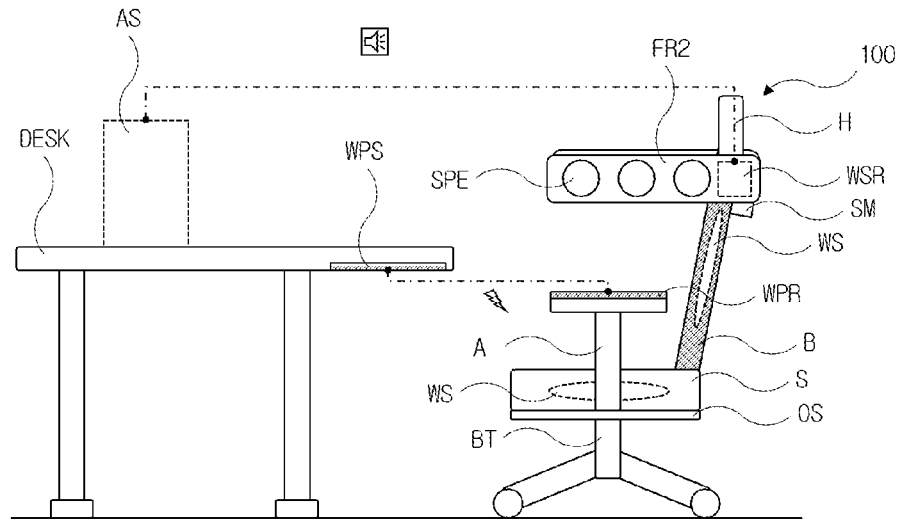
FIG. 15 is a lateral view of a chair according to another embodiment of the present invention.
Figure 16:
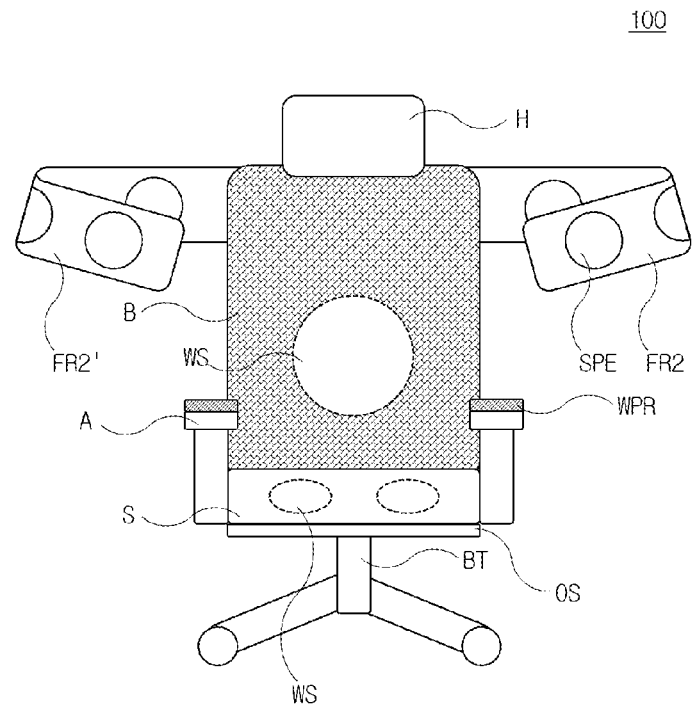
FIG. 16 is a front view of the chair illustrated in FIG. 15.

FIG. 15 is a lateral view of a chair according to another embodiment of the present invention, and FIG. 16 is a front view of the chair illustrated in FIG. 15.

Referring to FIGS. 15 and 16, at least one second frame FR2 extending a predetermined length toward a front may be installed on the backrest portion B, and a speaker installation area SA in which at least one speaker SPE is installed may be defined in a direction in which the second frame FR2 extends.

For example, referring to FIGS. 15 and 16, the second frame FR2 extending a predetermined length from the backrest portion B of the chair 100 toward a front of the chair 100 may be installed inside or behind the backrest portion B, the speaker installation area SA may be defined in the direction in which the second frame FR2 extends, and the speaker SPE may be installed in the speaker installation area SA. Also, the second frame FR2 may be divided into two second frames FR2 and FR2' which are separated from each other.

In a case in which the second frame FR2 is installed inside the backrest portion B, the second frame FR2 may have a shape that protrudes in at least one of both side directions of the backrest portion B and extends a predetermined length toward a front of the chair 100. Meanwhile, in a case in which the second frame FR2 is installed behind the backrest portion B, a separate support member SM configured to fix the second frame FR2 and the backrest portion B may be interposed, and the second frame FR2 may have a shape that is installed on the support member SM and extends a predetermined length from behind the backrest portion B toward the front of the chair 100.

The speaker SPE may be integrally provided with the second frame FR2 or provided to be detachable from the second frame FR2. Also, in another modified example, the second frame FR2 may be configured by connecting a plurality of speakers SPE to each other.

Also, the speaker installation area SA may be an area in which the speaker SPE is directly installed, but the speaker SPE may be indirectly installed in the speaker installation area SA. In the case in which the speaker SPE is indirectly installed in the speaker installation area SA, the second frame FR2 extending a predetermined length from the backrest portion B of the chair 100 toward a front of the chair 100 may be installed, and an auxiliary frame in which at least one speaker SPE is installed may be installed in the speaker installation area SA defined in the direction in which the second frame FR2 extends.

The second frame FR2 installed on the backrest portion B may be installed as many as an appropriate number necessary to implement the multi-channel sound system.

Here, the speaker SPE may be a speaker in the form of a complete product, a speaker unit connected to a driving portion separately provided at the speaker installation area SA and configured to operate as a complete product, a display type speaker, a thin-film type speaker, or a one-way or multi-way speaker, and the speaker SPE may operate by receiving sound signals through wires or wirelessly.

Also, the speaker SPE may be directly installed in the speaker installation areas SA, but the present invention is not necessarily limited thereto, and a separate speaker installation stand may be interposed between the speaker installation area SA and the speaker SPE.

Meanwhile, the second frame FR2 may have a linear shape that extends a predetermined length from the backrest portion B toward a front of the chair 100 (or a front of the user who sits in the chair 100) and may have a nonlinear shape including various shapes such as a broken-line shape or a curved shape, as necessary. In this case, the speaker SPE may be installed on an inner side surface of the second frame FR2, that is, a surface thereof facing the user who sits in the chair 100. Also, the second frame FR2 may have a shape that is bent from the backrest portion B toward the front of the chair 100.

Also, the second frame FR2 may be provided to be able to move upward or downward along the backrest portion B.

Instead of being applied only to the second frame FR2, the shape of the second frame FR2 may be equally applied to a third frame FR3 and a fourth frame FR4 which will be described below. Also, it should be understood that the presence of the second frame FR2 does not preclude the presence of the first frame FR1 which has been described above and the third frame FR3 and the fourth frame FR4 which will be described below, and at least one of the first frame FR1, the second frame FR2, the third frame FR3, and the fourth frame FR4 may be installed on the chair 100.

Figure 17:
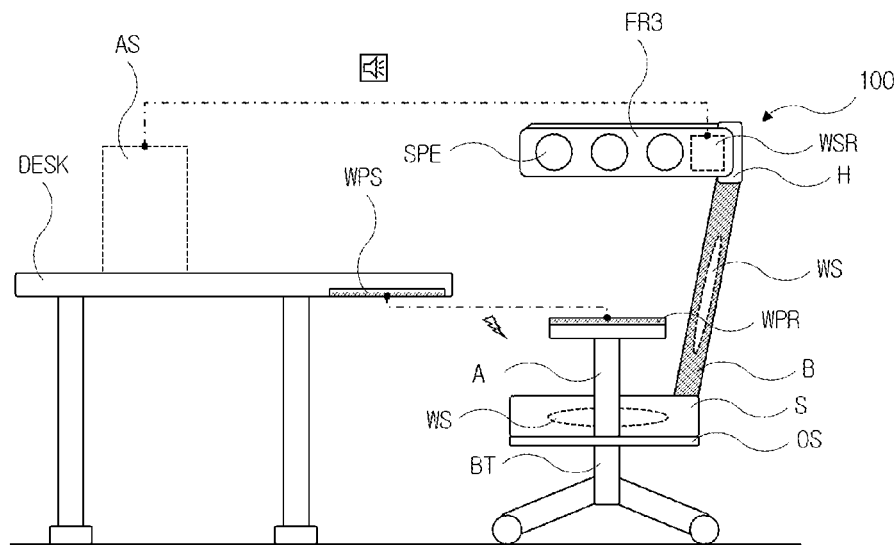
FIG. 17 is a lateral view of a chair according to still another embodiment of the present invention.
Figure 18:
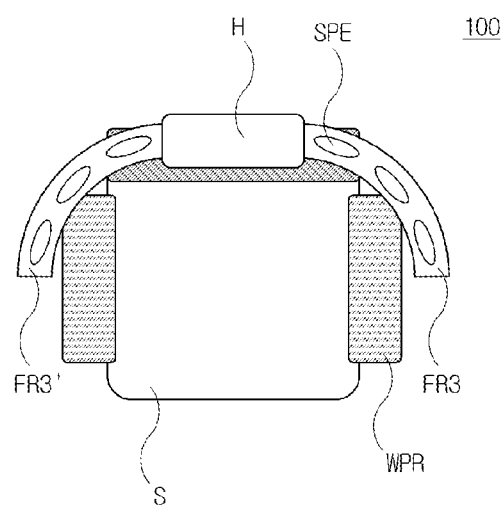
FIG. 18 is a top view of the chair illustrated in FIG. 17.

FIG. 17 is a lateral view of a chair according to still another embodiment of the present invention, and FIG. 18 is a top view of the chair illustrated in FIG. 17.

Referring to FIGS. 17 and 18, at least one third frame FR3 extending a predetermined length toward a front may be installed on the headrest portion H, and a speaker installation area SA in which at least one speaker SPE is installed may be defined in a direction in which the third frame FR3 extends.

For example, referring to FIGS. 17 and 18, the third frame FR3 extending a predetermined length from the headrest portion H of the chair 100 toward a front of the chair 100 may be installed inside or behind the headrest portion H, the speaker installation area SA may be defined in the direction in which the third frame FR3 extends, and the speaker SPE may be installed in the speaker installation area SA. Also, the third frame FR3 may be divided into two third frames FR3 and FR3' which are separated from each other.

In a case in which the third frame FR3 is installed inside the headrest portion H, the third frame FR3 may have a shape that protrudes in at least one of both side directions of the headrest portion H and extends a predetermined length toward a front of the chair 100.

Figure 19:
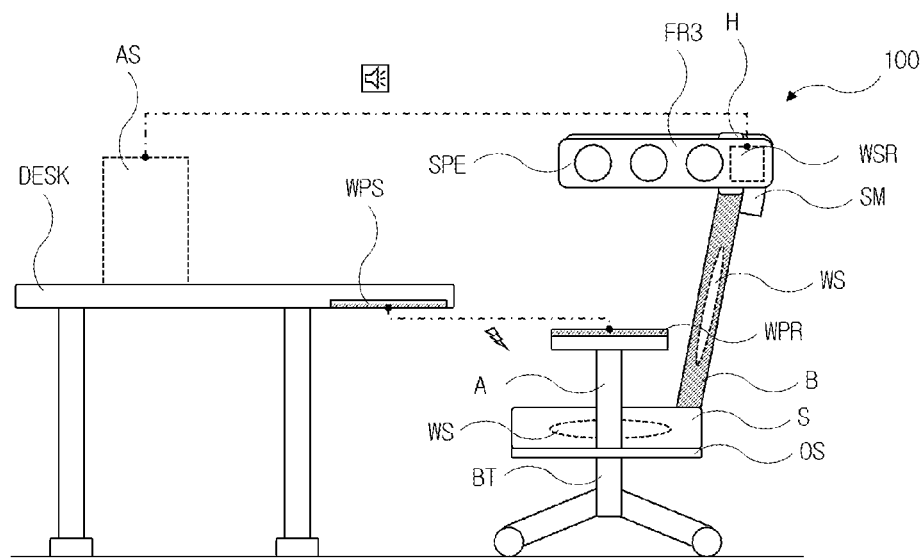
FIG. 19 illustrates a modified example of the chair illustrated in FIG. 17.
Figure 20:
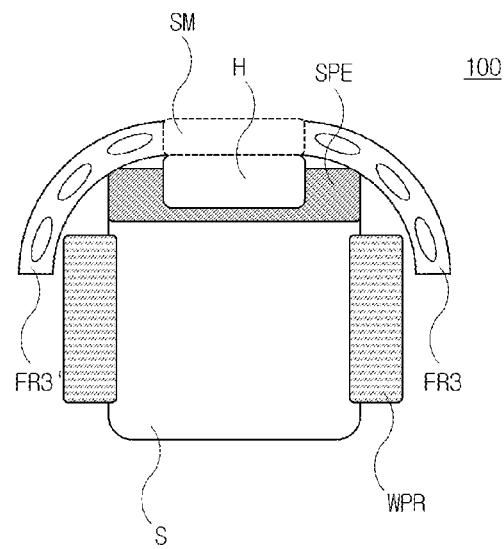
FIG. 20 is a top view of the chair illustrated in FIG. 19.

Meanwhile, referring to FIGS. 19 and 20 illustrating a modified example of the chair illustrated in FIG. 17, in a case in which the third frame FR3 is installed behind the headrest portion H, a separate support member SM configured to fix the third frame FR3 and the headrest portion H may be interposed, and the third frame FR3 may have a shape that is installed on the support member SM and extends a predetermined length from behind the headrest portion H toward the front of the chair 100.

The speaker SPE may be integrally provided with the third frame FR3 or provided to be detachable from the third frame FR3. Also, in another modified example, the third frame FR3 may be configured by connecting a plurality of speakers SPE to each other.

Also, the speaker installation area SA may be an area in which the speaker SPE is directly installed, but the speaker SPE may be indirectly installed in the speaker installation area SA. In the case in which the speaker SPE is indirectly installed in the speaker installation area SA, the third frame FR3 extending a predetermined length from the headrest portion H of the chair 100 toward a front of the chair 100 may be installed, and an auxiliary frame in which at least one speaker SPE is installed may be installed in the speaker installation area SA defined in the direction in which the third frame FR3 extends.

The third frame FR3 installed on the headrest portion H may be installed as many as an appropriate number necessary to implement the multi-channel sound system.

Here, the speaker SPE may be a speaker in the form of a complete product, a speaker unit connected to a driving portion separately provided at the speaker installation area SA and configured to operate as a complete product, a display type speaker, a thin-film type speaker, or a one-way or multi-way speaker, and the speaker SPE may operate by receiving sound signals through wires or wirelessly.

Also, the speaker SPE may be directly installed in the speaker installation areas SA, but the present invention is not necessarily limited thereto, and a separate speaker installation stand may be interposed between the speaker installation area SA and the speaker SPE.

Meanwhile, the third frame FR3 may have a linear shape that extends a predetermined length from the headrest portion H toward a front of the chair 100 (or a front of the user who sits in the chair 100) and may have a nonlinear shape including various shapes such as a broken-line shape or a curved shape, as necessary. In this case, the speaker SPE may be installed on an inner side surface of the third frame FR3, that is, a surface thereof facing the user who sits in the chair 100. Also, the third frame FR3 may have a shape that is bent from the headrest portion H toward the front of the chair 100.

Figure 21:
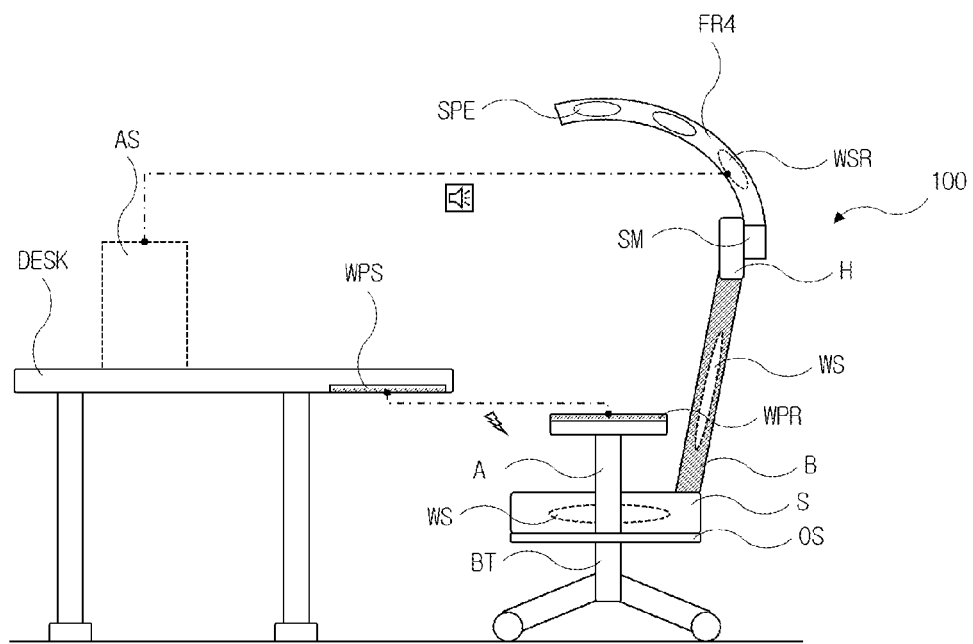
FIG. 21 illustrates another modified example of the chair illustrated in FIG. 17.

Also, referring to FIG. 21 illustrating another modified example of the chair illustrated in FIG. 17, unlike in FIGS. 17 to 20, at least one fourth frame FR4 that passes by a portion above the user who sits in the chair 100, instead of passing by a side of the user, and extends a predetermined length toward a front may be installed on the headrest portion H, and a speaker installation area SA in which at least one speaker SPE is installed may be defined in a direction in which the fourth frame FR4 extends.

Detailed descriptions of the fourth frame FR4 and the speaker SPE installed in the fourth frame FR4 are the same as those of the first frame FR1, the second frame FR2, and/or the third frame FR3 except for the structural differences described above.

Embodiments of the present invention have been described above, but those of ordinary skill in the art may make various modifications and changes to the present invention by adding, changing, or omitting components within the scope not departing from the spirit of the present invention defined in the claims below, and such modifications and changes also belong to the scope of rights of the present invention.

What is claimed is:

1. A wireless speaker chair including at least 1) a backrest portion configured to support a back and waist part of a user, 2) a headrest portion placed on the uppermost surface of the backrest portion and configured to support a head part of the user, 3) side support portions configured to support sides of the user, 4) a seat portion configured to support a buttocks part and a part of legs of the user, and 5) a bottom support portion configured to support a bottom of the seat portion, the wireless speaker chair comprising:
a speaker mounting member attached on an upper area of a rear surface of the backrest portion of the chair,
wherein the speaker mounting member comprises:
a first portion fixed on the upper area of the rear surface of the backrest portion;
a second portion that is straightly extended toward a left side of the backrest portion, from a left-end of the first portion;
a third portion that is straightly extended toward a right side of the backrest portion, from a right-end of the first portion;
a fourth portion that is bent from a left-end of the second portion and is extended toward a front direction of the wireless speaker chair;
a fifth portion that is bent from a right-end of the third portion and is extended toward the front direction of the wireless speaker chair; and
a plurality of speaker installation areas distributed on the second portion, the third portion, the fourth portion, and the fifth portion, and
wherein each of the uppermost surface of the second portion and the uppermost surface of the third portion is positioned below the uppermost surface of the backrest portion;
a wireless signal reception portion configured to receive a wirelessly transmitted audio signal and transmit the received audio signal to a plurality of speakers installed in the plurality of speaker installation areas; and
a wireless power reception portion installed in a predetermined area of the chair and configured to wirelessly receive power supplied from a wireless power supply portion,
wherein the plurality of speakers are configured to operate by receiving the power received by the wireless power reception portion wirelessly or through wires.

2. The wireless speaker chair of claim 1, wherein the wireless signal reception portion is provided in the plurality of speaker installation areas or provided in the plurality of speakers installed in the plurality of speaker installation areas.

3. The wireless speaker chair of claim 1, wherein the wireless power reception portion receives wirelessly supplied power using at least one method selected from a magnetic field method, an electromagnetic wave method using radio frequency, and an ultrasonic wave method.

4. The wireless speaker chair of claim 1, wherein the side support portion is provided to be able to move upward or downward to align the wireless power reception portion, which is provided above the side support portion, with the wireless power supply portion configured to wirelessly supply power to the wireless power reception portion.

5. The wireless speaker chair of claim 1, wherein the side support portion is provided to be able to slide back and forth to align the wireless power reception portion, which is provided above the side support portion, with the wireless power supply portion configured to wirelessly supply power to the wireless power reception portion.

6. The wireless speaker chair of claim 1, wherein the wireless power reception portion is provided in the plurality of speaker installation areas or provided in the plurality of speakers installed in the plurality of speaker installation areas.

7. The wireless speaker chair of claim 1, wherein a magnetic member for magnetic coupling between the wireless power reception portion and the wireless power supply portion configured to wirelessly supply power to the wireless power reception portion is disposed at a position adjacent to the wireless power reception portion.

8. The wireless speaker chair of claim 1, further comprising a power storage portion electrically connected to the wireless power reception portion to receive and store power received by the wireless power reception portion,
wherein the power storage portion transmits the stored power to the plurality of speakers installed in the plurality of speaker installation areas.

9. The wireless speaker chair of claim 8, wherein the power storage portion is provided in the plurality of speaker installation areas or provided in the plurality of speakers installed in the plurality of speaker installation areas.

10. The wireless speaker chair of claim 1, wherein the wireless power reception portion is provided to be detachable from a position at which the wireless power reception portion is installed.

11. The wireless speaker chair of claim 1, wherein the wireless signal reception portion comprises:
a first wireless signal receptor positioned at a first area that connects the fourth portion with the second portion, and
a second wireless signal receptor positioned at a second area that connects the fifth portion with the third portion.

12. The wireless speaker chair of claim 1, wherein a respective speaker of the plurality of speakers is integrally installed in a respective speaker installation area of the plurality of speaker installation areas, and the respective speaker does not have a portion protruded from the respective speaker installation area.

\* \* \* \* \*